United States Patent [19]

Kang

[11] Patent Number: 5,163,573
[45] Date of Patent: Nov. 17, 1992

[54] EXPLOSION SUPPRESSIVE FOIL

[76] Inventor: Chong K. Kang, 92-3, Yeonhi-dong, Sudaemoon-Ku, Seoul, Rep. of Korea

[21] Appl. No.: 700,456

[22] Filed: May 15, 1991

[51] Int. Cl.⁵ .............................................. B65D 25/16
[52] U.S. Cl. .................................. 220/88.2; 220/88.1; 220/563; 220/470
[58] Field of Search .................. 220/563, DIG. 9, 400, 220/470, 670, 88.1, 88.2

[56] References Cited

U.S. PATENT DOCUMENTS

| | | | |
|---|---|---|---|
| 2,296,747 | 9/1942 | Stover | 220/88.1 X |
| 3,356,256 | 12/1967 | Szego | 220/88.1 |
| 3,804,292 | 4/1974 | Chiti | 220/88.1 X |
| 4,013,190 | 3/1977 | Wiggins et al. | 220/88.1 X |
| 4,015,954 | 4/1977 | Reed | 220/88.2 X |
| 4,149,649 | 4/1979 | Szego | 220/88.2 |
| 4,249,669 | 2/1981 | Szego | 220/88.2 X |
| 4,566,589 | 1/1986 | Poschinger | 220/88.2 X |
| 4,925,053 | 5/1990 | Fenton et al. | 220/88.1 |
| 4,927,045 | 5/1990 | Lichka | 220/88.1 |
| 4,930,651 | 6/1990 | Szego | 220/88.1 |
| 4,988,011 | 1/1991 | Fenton et al. | 220/88.1 |
| 5,000,336 | 3/1991 | Gass | 220/88.1 |

FOREIGN PATENT DOCUMENTS 0001502 of 1897 United Kingdom ............... 220/88.1

Primary Examiner—Stephen Marcus
Assistant Examiner—Paul A. Schwarz
Attorney, Agent, or Firm—Wenderoth, Lind & Ponack

[57] ABSTRACT

This invention relates to an explosion suppressive foil inserted within a container charged with inflammable or explosive liquid. This explosion suppressive foil is made of an aluminum alloy foil substrate having a number of slant surfaces having cylindrical walls are arranged side by side so as to be adjoined together thereon, and a circular hole is defined on every annular slant surface.

2 Claims, 2 Drawing Sheets

EXPLOSION SUPPRESSIVE FOIL

BACKGROUND OF THE INVENTION

1. Field of the Invention

The present invention relates to an explosion suppressive foil which is inserted into a container or tank containing inflammable liquid or explosive liquid whereby a number of safe gaps are defined within the container so that explosion is suppressed or prevented, and more particularly, to an explosion suppressive foil in which the effective magnitude of a unit safe gap is maximized so that the volume occupied by the foil upon charging within the container becomes minimized, and at the same time, a portion defining the safe gap, that is the directional property of the safe gap defining member is eliminated so that the explosion suppressive effect is increased.

2. Description of the Prior Art

Conventionally, a commercially available explosion suppressive foil, known as EXPLOSAFE (trademark), is inserted into a container so that a number of safe gaps are defined within the container charged with inflammable or explosive liquid.

According to the conventional technique, since the structure of safe gap is constructed by a vertical wall, the definition of a safe gap is uncertain because it has a directional property in vertical direction even if safe gaps are arranged so as to be staggered up and down. In this case, it is judged that safe gaps are extended by adjoining ones so that ensuring of an effective quenching distance is difficult.

SUMMARY OF THE INVENTION

Therefore, the present invention was made in consideration of such conventional disadvantage, and it is an object of the present invention to provide an explosion suppressive foil in which the directional property of the safe gap is eliminated so that its explosion suppression effect is excellent.

In order to attain above-described object, according to the present invention, the explosion suppressive foil is made of aluminum alloy foil having a number annular of slant surfaces with cylindrical walls arranged thereon so as to be adjoined together and a circular hole is defined on each annular slant surface.

The foregoing and other objects as well as advantages of the present invention will become clear by the following description of the invention with reference to the accompanying drawings.

The term "safe gap" used herein means a gap in which heat is taken away by a member defining the safe gap, i.e., a safe gap defining member in the case when a flame is dropped therein so that it is quenched, and the magnitude of this safe gap is based on the quenching distance theory of B. Lewis that no flame of any gas can exist within smaller space than a quenching distance of a gas, and the formula of Barnett for calculating the quenching distance is as follows:

$$d = 0.1 \left(\frac{520}{t}\right)^{0.5} \cdot \left(\frac{1}{P}\right)^{0.9}$$

Wherein, d represents a quenching distance (inch), t is temperature (°K). and P is absolute pressure (atm). For instance, the quenching distance of propane calculated by using this formula is 0.03 cm within oxygen, and 0.17 cm within air.

BRIEF DESCRIPTION OF THE DRAWINGS

For a better understanding of the invention, and to show how the same may be carried out, reference will now be made, by way of example, with respect to the accompanying drawings, in which.

Throughout the drawings, like reference numerals and symbols are used for designating like or equivalent parts or portions, for simplicity of illustration and explanation.

DETAILED DESCRIPTION OF THE EMBODIMENTS

Figure 1:
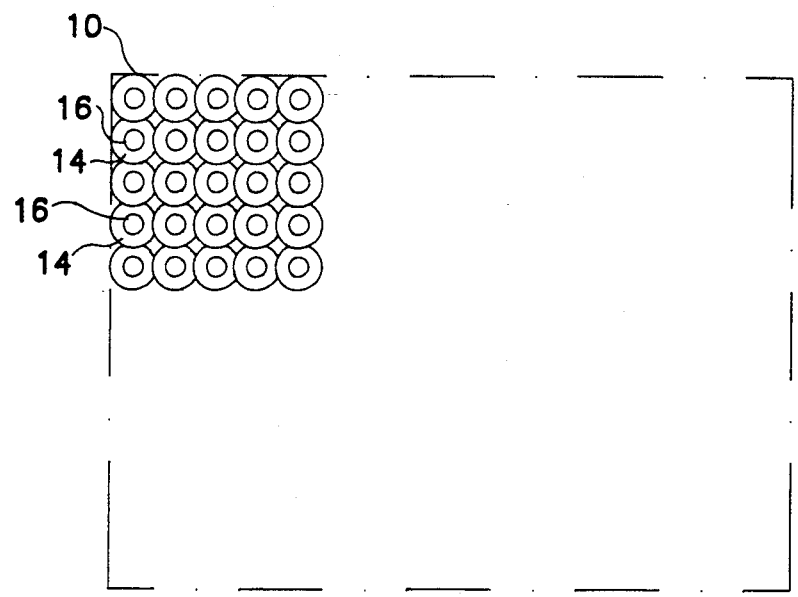
FIG. 1 is a plane view of the first embodiment according to the present invention in which similar parts are deleted for illustration.
Figure 2:
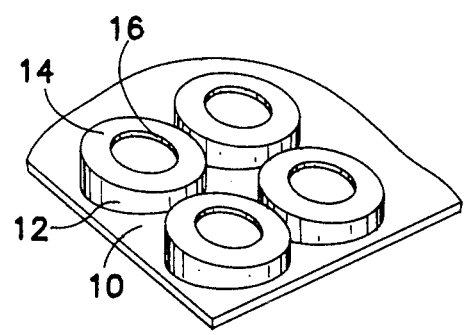
FIG. 2 is a fragmentary perspective view of the first embodiment according to the present invention.
Figure 3:
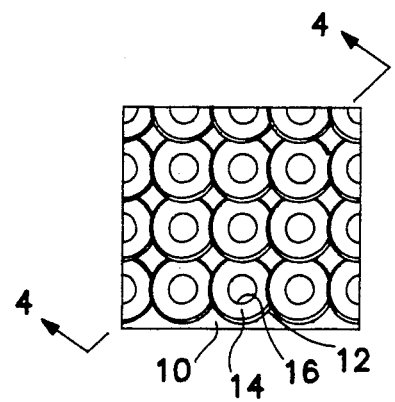
FIG. 3 is a fragmentary magnified plane view of the first embodiment according to the present invention.

Hereinafter, the preferred embodiments of the present invention will be described in detail with reference to the accompanying drawings.

As shown in FIGS. 1 to 4, an explosion suppressive foil 10 of the first embodiment according to the present invention is composed of an aluminum foil substrate and a number of annular slant surfaces 14 having a slightly inclined cylindrical walls 12, formed by pressing said substrate, which are arranged successively side by side so as to be adjoined together and a circular hole 16 is defined on each annular slant surface 14.

For instance, an aluminum foil for forming the foil is an aluminum alloy and 0.055–0.2 mm in thickness, preferably 0.055–0.05 mm, and 0.089–0.098 g/cm³ in density, and H 15–H 24 in hardness.

In the first embodiment, the outside diameter of annular slant surface 14 is 7–7.5 mm, the maximum height of a higher portion of the cylindrical wall 2 is 1.3 mm and 0.3 mm in minimum height of a lower portion, the diameter of the circular hole 16 is 3 mm and the ratio of the circular hole area to whole foil area is 23.015%, with 1842 holes per square feet (ft²).

Figure 4:
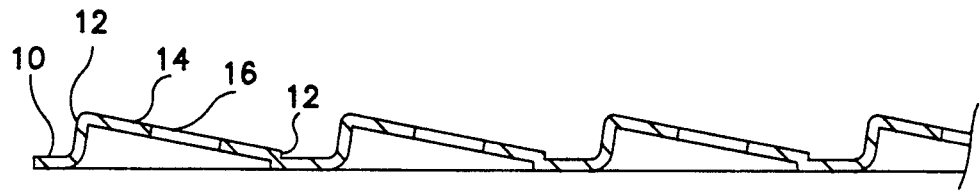
FIG. 4 is a cross-sectional view taken along line A—A of FIG. 3.
Figure 5:
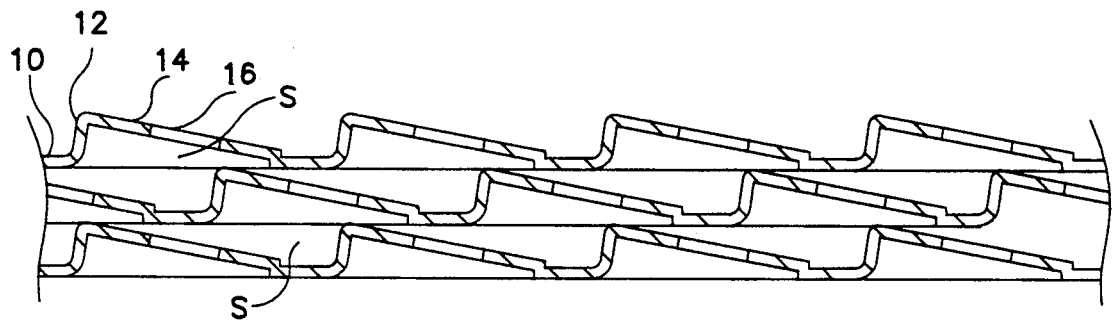
FIG. 5 is a cross-sectional view for showing the state where safe gaps are defined in the case when the foils of the first embodiment according to the present invention are piled and filled.

A cross-sectional view of this embodiment is shown in detail in FIG. 4, and upper and lower annular slant surfaces 3 are arranged so as to be staggered in case when the foil 10 of the present invention is inserted within a container charged with inflammable or explosive liquid, and an example of the arrangement is shown in FIG. 5. Here, safe gaps S are defined by a space made by the cylindrical wall 12 and annular slant surface 3 and the foil 10 arranged to be staggered at its bottom side.

The thus produced foil of the present invention has the effect that the parts defining the safe gaps S are independently defined so that directional properties are eliminated i.e. up and down or right and left, and since the inflammable or explosive liquid is filled within all safe gaps S through the circular holes 16, the filling volume of the foil of the present invention when inserted in a container is relatively small.

Figure 6:
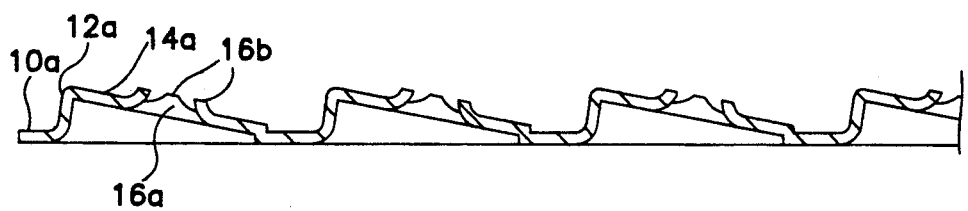
FIG. 6 is a cross-sectional view of a second embodiment according to the present invention which is similar to FIG. 4.

FIG. 6 shows a second embodiment according to the present invention, wherein the explosion suppressive foil 10a is composed of an aluminum alloy foil, and it is similar to the first embodiment in that both have the cylindrical wall 12a and the annular slant surface 14a. However, according to the circular hole 16 of the first embodiment, its internal circumferential edge is made in a clear circular form, but the circular hole 16a of the second embodiment is made in a form having burr 16b which remains in the slant direction (in the view on the drawing) from the internal circumferential edge portion.

This burr 16b of the second embodiment is that which remains when the circular hole 16a is formed by perforating the foil substrate with a tool of pin shape having a sharp tip end portion relative to that when the circular hole 16 of the first embodiment is formed by punching by using a punching die.

The first embodiment has to use a punching die where punching formation of the circular hole 16 results in said die being easily worn out; on the contrary, the second embodiment is formed with the circular hole 16a by a tool of pin shape having a sharp tip end portion, therefore, it has advantage that manufacturing is simple.

Generally, the safe gap S is desirably set at a magnitude less than $\frac{1}{2}$ of the quenching distance in order to increase the safety, but in the present invention, since a number of foils are inserted in a piled form within a container, it is believed that effect of explosion suppression is included even if the safe gap is made slightly bigger in practice than the quenching distance in said embodiments.

It will be appreciated that the present invention is not restricted to the particular embodiments that have been described hereinbefore, and that variations and modifications may be made therein without departing from the spirit and scope of the invention as defined in the appended claims and equivalents thereof.

I claim:

1. In an explosion suppressive foil to be inserted in a container charged with inflammable or explosive liquid, the improvement wherein said explosion suppressive foil is composed of an aluminum alloy foil substrate having thereon a number of annular slant surfaces with cylindrical walls arranged side by side so as to be adjoined together, and a circular hole defined on each annular slant surface, said annular slant surfaces with cylindrical walls being formed by pressing said aluminum alloy foil substrate.

2. The explosion suppressive foil according to claim 1, wherein a burr is formed on the inner circumferential edge portion of every circular hole.

* * * * *